(12) United States Patent
Kwan

(10) Patent No.: US 8,865,621 B2
(45) Date of Patent: Oct. 21, 2014

(54) IRREVERSIBLE COLOR CHANGING INK COMPOSITIONS

(75) Inventor: Wing Sum Vincent Kwan, Chicago, IL (US)

(73) Assignee: Sanford, L.P., Downers Grove, IL (US)

( * ) Notice: Subject to any disclaimer, the term of this patent is extended or adjusted under 35 U.S.C. 154(b) by 0 days.

(21) Appl. No.: 13/568,048

(22) Filed: Aug. 6, 2012

(65) Prior Publication Data
US 2014/0037362 A1 Feb. 6, 2014

(51) Int. Cl.
*B41M 5/128* (2006.01)
*C09D 5/26* (2006.01)
*C09D 11/16* (2014.01)
*C09D 11/18* (2006.01)

(52) U.S. Cl.
CPC ............... *B41M 5/128* (2013.01); *C09D 11/18* (2013.01); *C09D 5/26* (2013.01); *C09D 11/16* (2013.01); *B41M 2205/18* (2013.01)
USPC .......................... 503/201; 503/205; 106/31.23

(58) Field of Classification Search
CPC .. B41M 5/128; B41M 5/165; B41M 2205/18; C09D 5/26; C09D 11/16; C09D 11/18
USPC .......... 503/200–226; 106/31.32, 31.64, 31.23
See application file for complete search history.

(56) References Cited

U.S. PATENT DOCUMENTS

| | | | |
|---|---|---|---|
| 3,516,941 A | 6/1970 | Matson | |
| 3,560,229 A | 2/1971 | Farnham | |
| 3,658,543 A | 4/1972 | Gerlach, Jr. et al. | |
| 4,021,591 A | 5/1977 | DeVries et al. | |
| 4,028,118 A | 6/1977 | Nakasuji et al. | |
| 4,062,644 A | 12/1977 | Sponaes et al. | |
| 4,162,165 A | 7/1979 | Schwab | |
| 4,254,971 A * | 3/1981 | Isaac | 503/219 |
| 4,421,560 A | 12/1983 | Kito et al. | |
| 4,425,161 A | 1/1984 | Shibahashi et al. | |
| 4,547,429 A | 10/1985 | Greiner et al. | |
| 4,550,676 A | 11/1985 | Francis | |
| 4,620,941 A | 11/1986 | Yoshikawa et al. | |
| 4,622,267 A | 11/1986 | Riecke | |
| 4,720,301 A | 1/1988 | Kito et al. | |
| 4,732,810 A | 3/1988 | Kito et al. | |
| 4,865,648 A | 9/1989 | Kito et al. | |
| 4,935,401 A * | 6/1990 | Pendergrass, Jr. | 503/206 |
| 5,002,924 A | 3/1991 | Seitz | |
| 5,120,360 A * | 6/1992 | Tajiri et al. | 106/31.57 |
| 5,128,308 A | 7/1992 | Talvalkar | |
| 5,194,183 A | 3/1993 | Munch et al. | |
| 5,248,652 A | 9/1993 | Talvalkar | |
| 5,350,633 A | 9/1994 | Sumii et al. | |
| 5,350,634 A | 9/1994 | Sumii et al. | |
| 5,401,577 A | 3/1995 | Seitz | |
| 5,500,040 A | 3/1996 | Fujinami | |
| 5,527,385 A | 6/1996 | Sumii et al. | |
| 5,558,699 A | 9/1996 | Nakashima et al. | |
| 5,558,700 A | 9/1996 | Shibahashi et al. | |

| | | |
|---|---|---|
| 5,591,255 A | 1/1997 | Small et al. |
| 5,785,746 A | 7/1998 | Kito et al. |
| 5,786,838 A | 7/1998 | Steinhauser et al. |
| 5,873,932 A | 2/1999 | Fujita et al. |
| 5,879,438 A | 3/1999 | Fujita et al. |
| 5,879,443 A | 3/1999 | Senga et al. |
| 5,919,404 A | 7/1999 | Fujita et al. |
| 5,922,115 A | 7/1999 | Sano et al. |
| 5,997,849 A | 12/1999 | Small et al. |
| 6,004,900 A | 12/1999 | O'Brien, III |
| 6,048,387 A | 4/2000 | Shibahashi et al. |
| 6,139,779 A | 10/2000 | Small et al. |
| 6,251,571 B1 | 6/2001 | Dessauer et al. |
| 6,326,332 B1 | 12/2001 | Takayama |
| 6,413,305 B1 | 7/2002 | Mehta et al. |
| 6,494,950 B1 | 12/2002 | Fujita et al. |
| 6,638,620 B2 | 10/2003 | Nakashima et al. |
| 6,669,765 B2 | 12/2003 | Senga et al. |
| 6,700,125 B2 | 3/2004 | Ito et al. |
| 6,863,720 B2 | 3/2005 | Kitagawa et al. |
| 6,953,345 B1 | 10/2005 | Nakashima et al. |
| 6,964,168 B1 | 11/2005 | Pierson et al. |
| 7,168,876 B2 | 1/2007 | Nakashima et al. |
| 7,325,910 B2 | 2/2008 | Pelletier |
| 7,332,109 B2 | 2/2008 | Senga et al. |
| 7,335,624 B2 | 2/2008 | Senga et al. |
| 7,494,537 B2 | 2/2009 | Ono et al. |
| 7,575,386 B2 | 8/2009 | Shibahashi et al. |
| 7,632,564 B2 | 12/2009 | Nakashima |
| 7,708,913 B2 | 5/2010 | Fujita |
| 7,736,695 B2 | 6/2010 | Schwantes et al. |
| 8,182,596 B2 | 5/2012 | Kurihara et al. |
| 2002/0107304 A1 | 8/2002 | Leu et al. |
| 2002/0170461 A1 | 11/2002 | Mehta et al. |
| 2003/0122123 A1 | 7/2003 | Deng et al. |
| 2004/0229754 A1 | 11/2004 | Fujita |

(Continued)

FOREIGN PATENT DOCUMENTS

| | | |
|---|---|---|
| DE | 10303914 A1 | 8/2004 |
| EP | 1149880 A1 | 10/2001 |

(Continued)

OTHER PUBLICATIONS

Matsui Shikiso Chemical Co., Ltd, Technical Data Sheet for Thermolock AQ Ink #79 (Aug. 5, 2009).

(Continued)

*Primary Examiner* — Bruce H Hess
(74) *Attorney, Agent, or Firm* — Marshall, Gerstein & Borun LLP

(57) ABSTRACT

The disclosure is generally related to an irreversible thermochromic ink composition and, more particularly, to an irreversible thermochromic ink composition comprising a carrier and thermochromic capsules, the thermochromic capsules comprising a shell and a core, the core comprising an eradicable dye capable of becoming substantially colorless and/or of changing color from a first colored state to a second colored state when exposed to an eradicator.

22 Claims, No Drawings

(56) References Cited

U.S. PATENT DOCUMENTS

| | | |
|---|---|---|
| 2006/0112851 A1 | 6/2006 | Ono et al. |
| 2007/0189836 A1 | 8/2007 | Senga et al. |
| 2007/0251912 A1 | 11/2007 | Sixou et al. |
| 2008/0113862 A1 | 5/2008 | Stovold et al. |
| 2008/0124164 A1 | 5/2008 | Ito et al. |
| 2008/0292385 A1 | 11/2008 | Wase et al. |
| 2009/0050013 A1 | 2/2009 | Fujita |
| 2009/0071370 A1 | 3/2009 | Nakashima |
| 2010/0012018 A1 | 1/2010 | Ribi |
| 2010/0098475 A1 | 4/2010 | Fujita et al. |
| 2010/0098476 A1 | 4/2010 | Imamura et al. |
| 2010/0120614 A1 | 5/2010 | Ono |
| 2010/0275813 A1 | 11/2010 | Kurihara et al. |

FOREIGN PATENT DOCUMENTS

| | | |
|---|---|---|
| EP | 1469046 A1 | 10/2004 |
| FR | 1223330 A | 6/1960 |
| WO | WO-01/04221 A1 | 1/2001 |

OTHER PUBLICATIONS

Muthyala (ed.), Chemistry and Applications of Leuco Dyes, Topics in Applied Chemistry, Plenum Press (1997).

International Search Report and Written Opinion, corresponding International Application No. PCT/US2013/046274, mailing date Nov. 5, 2013.

\* cited by examiner

IRREVERSIBLE COLOR CHANGING INK COMPOSITIONS

FIELD OF THE DISCLOSURE

The disclosure is generally related to irreversible color-changing ink compositions and, more particularly, to irreversible color-changing ink compositions including an encapsulated eradicable dye capable of becoming substantially colorless and/or of changing color from a first colored state to a second colored state.

BACKGROUND

Thermochromic inks change color in response to changes in temperature. Known thermochromic inks often include leuco dyes as the color changing component. Leuco dyes typically exist in two different forms, a colored form and a substantially colorless form. Leuco dyes which change forms in response to local changes in pH are typically used in known thermochromic inks. The change in pH can be brought about in such systems by contacting the leuco dye with a color activator/developer which can induce proton transfer to the leuco dye and thereby cause the leuco dye to adopt its colored form, but similar color changes from substantially colorless to colored can also result from electron transfer and/or proton transfer reactions. From a structural standpoint, the change from substantially colorless to colored is often induced by cleaving a lactone ring to form a more highly conjugated species that absorbs in the visible range. The reverse change from colored to substantially colorless can then be brought about by proton abstraction and reformation of the lactone ring.

Known thermochromic inks often exhibit 'hysteresis' associated with the color change, i.e., the color change of written marks made with such inks is reversible. One representative example, U.S. Pat. No. 5,558,699, discloses a thermochromic color-memory composition comprising a homogeneous solubilized mixture of three essential components including (a) an electron-donating color-developing organic compound, (b) an electron-accepting compound, and (c) a reaction medium for controlling the reaction of (a) with (b). The thermochromic compositions of the '699 patent change color with a large hysteresis width ($\Delta H$) of from 8° C. to 80° C. As a result, written marks made using the thermochromic inks typically exhibit a colored state at room temperature, change from the colored state to substantially colorless upon application of heat (i.e., heat can be applied to a substrate to erase written marks previously made thereon), and change back to the initial colored state when cooled below a certain temperature (i.e., the substrate is cooled, thereby "re-forming" the color of the written marks). Thus, known thermochromic inks typically include a reaction medium which can promote or impede the reaction between the leuco dye and the activator at certain temperatures, such that the leuco dye is present in its colorless form at certain temperatures which are typically substantially above room temperature.

The facile reversibility of the color change can be particularly undesirable in certain situations, for example, if the consumer does not wish for the original written marks to be "re-revealed" upon cooling.

SUMMARY

Disclosed herein are irreversible color-changing ink compositions including a carrier and color-changing capsules dispersed in the carrier. The color-changing capsules include a shell and a core and the core includes an eradicable dye capable of becoming substantially colorless and/or of changing color from a first colored state to a second colored state. The core can further include a solvent. The shell is preferably frangible, i.e., the shell ruptures (rather than is plastically deformed) when pressure is applied thereto. The irreversible color-changing ink composition typically further includes an eradicator that is optionally emulsified into the carrier.

Also disclosed herein are writing instruments containing irreversible color-changing ink compositions including a carrier and color-changing capsules dispersed in the carrier. Suitable writing instruments typically include a writing point in fluid communication with an ink reservoir. Representative writing instruments include but are not limited to ball point pens, felt tip pens, fountain pens and markers. The color-changing capsules include a shell and a core and the core includes an eradicable dye capable of becoming substantially colorless and/or of changing color from a first colored state to a second colored state. The core can further include a solvent. The shell is preferably frangible, i.e., the shell ruptures (rather than is plastically deformed) when pressure is applied thereto. The irreversible color-changing ink composition typically further includes an eradicator that is optionally emulsified into the carrier.

A method of irreversibly eradicating a written mark is also disclosed. The method comprises forming an eradicable written mark by applying an irreversible color-changing ink to a substrate, the irreversible color-changing ink comprising a carrier and color-changing capsules dispersed in the carrier, the color-changing capsules comprising a shell and a core, the core comprising an eradicable dye capable of becoming substantially colorless, and the carrier comprising an eradicator. The color-changing capsules include a shell and a core and the core includes an eradicable dye capable of becoming substantially colorless and/or of changing color from a first colored state to a second colored state. The core can further include a solvent. The shell is preferably frangible, i.e., the shell ruptures (rather than is plastically deformed) when pressure is applied thereto. The irreversible color-changing ink composition typically further includes an eradicator that is optionally emulsified into the carrier. The method typically further includes applying a force directing component to the written mark thereby rupturing a portion of the color-changing capsules causing the eradicable dye to react with the eradicator thereby eradicating the written mark.

Also disclosed is a color-changing capsule comprising a shell and a core, the core comprising an eradicable dye capable of becoming substantially colorless and/or of changing color from a first colored state to a second colored state. The core can further include a solvent. The shell is preferably frangible, i.e., the shell ruptures (rather than is plastically deformed) when pressure is applied thereto.

DETAILED DESCRIPTION

Disclosed herein are irreversible color-changing ink compositions, methods of using the irreversible color-changing ink compositions, writing instruments containing the irreversible color-changing ink compositions, and irreversible color-changing capsules.

The disclosed irreversible color-changing ink compositions include a carrier and color-changing capsules dispersed in the carrier. The color-changing capsules include a shell and a core and the core includes an eradicable dye capable of becoming substantially colorless and/or of changing color from a first colored state to a second colored state. The core can further include a solvent. The shell is preferably frangible, i.e., the shell ruptures (rather than is plastically deformed) when pressure is applied thereto. The irreversible color-changing ink composition typically further includes an eradicator that is optionally emulsified into the carrier. Advantageously, the eradicable dye of the disclosed irreversible color-changing ink compositions becomes substantially colorless and/or changes colors upon exposure to (e.g., upon coming into contact with) the eradicator. The irreversible color-changing capsules and irreversible color-changing inks according to the disclosure are therefore capable of irreversibly changing color, for example, upon application of frictional forces during an erasure process as application of such frictional forces can cause the shell to rupture, thereby facilitating exposure of the eradicable dye to the eradicator. Such a color change is advantageously irreversible upon cooling.

As used herein, the term "irreversible color-changing" refers to an ink composition capable of undergoing a color change that cannot be reversed by application of a temperature change or an ink capsule including an ink composition capable of undergoing a color change that cannot be restored/reversed by application of a temperature change. As a result, the disclosed irreversible color-changing ink compositions cannot exhibit hysteresis and are generally considered to be erasable.

The irreversible color-changing ink compositions of the disclosure typically include a carrier comprising an eradicator and color-changing capsules comprising an eradicable dye capable of becoming substantially colorless and/or of changing color from a first colored state to a second colored state. In the disclosed irreversible color-changing ink compositions initially, the eradicable dye is not exposed to the eradicator but can be later exposed to the eradicator, for example, upon application of a force directing component to a written mark comprising the color-changing capsules so as to rupture a portion of the color-changing capsules and cause the eradicable dye to react with the eradicator and thereby eradicate the written mark. Thus, as a result of including this combination, the irreversible color-changing ink compositions and written markings made with the ink compositions are initially colored but become substantially colorless and/or change color after exposure of the eradicable dye to the eradicator.

For example, a written mark can be made on a substrate using the irreversible color-changing ink compositions disclosed herein. The written mark can be subjected to pressure, for example, by applying a force directing component, such as a conventional eraser, over and/or about the written mark. Exposure of the eradicable dye to the eradicator commences after pressure, (e.g., introduced by application of a force directing component) is applied to the written mark (which written mark includes a coating comprising a plurality of the irreversible color-changing pigment capsules) to rupture the irreversible color-changing pigment capsules. By rupturing the irreversible color-changing pigment capsules, the core contents, including the eradicable dye, are exposed to the other ink components such that the eradicable dye can interact with the eradicator. Upon exposure of the eradicable dye to the eradicator, the eradicable dye of the ruptured color-changing capsules can become substantially colorless (i.e., changes from colored to substantially colorless) and thus any written marks will be "erased", as further described below. In an alternative aspect, the written marks can change from a first colored state to a second colored state upon rupture of the irreversible color-changing pigment capsules, as explained in further detail below.

The erasure process can include the application of a frictional force to the written marks, so as to rupture the irreversible color-changing pigment capsules present in the written marks. Frictional forces can be applied, for example, using a force directing component such as a conventional eraser. Any material capable of applying a frictional force to a substrate can be a suitable force directing component to rupture the irreversible color-changing pigment capsules, including but not limited to rubber, thermoplastic materials, thermoplastic elastomers, metals, and wood.

Significantly, upon rupture of the color-changing capsules, the written marks undergo an irreversible color change from a first colored state to a second colored state (in one preferred aspect, the second colored state is substantially colorless). As a result, once written markings made with these irreversible color-changing ink compositions have lost their initial coloring, their initial color cannot be restored by cooling the markings (or the substrate which previously carried the markings), for example, because the irreversible color-changing ink compositions cannot exhibit thermal hysteresis in association with a temperature change after the eradicator has reacted with the eradicable dye. In some embodiments, the ink compositions do not contain any colorant other than the eradicable dye capable of becoming substantially colorless and/or changing color. As a result, the color of the written markings made in accordance with the disclosure can change upon application of frictional force from colored to substantially colorless (because the eradicable dye changes from colored to colorless upon exposure to the eradicator). Of course, if the eradicable dye does not change from colored to colorless, but instead changes from a first colored state to a second colored state upon exposure thereof to the eradicator, the color of the written marking will change from a first colored state to a second colored state (the second colored state being attributable to the second colored state of the eradicable dye). Similarly, if the ink composition contains an eradicable dye capable of becoming substantially colorless and further comprises at least one additional colorant that persists despite exposure thereof to the eradicator, the color of the written marking will change from a first colored state to a second colored state (the second colored state being attributable to the additional colorant(s)). Any number of conventional pigments (which are not eradicable) and non-eradicable dyes could be used as the additional colorant that persists despite exposure thereof to the eradicator.

Color-Changing Capsules

The irreversible color-changing ink as described herein includes color-changing capsules. The color-changing capsules include a core (generally corresponding to an interior/center of the capsules) and a shell which provides a continuous, exterior surface that encapsulates and contains the core components, which are typically liquid.

The color-changing capsule shells generally comprise about 5 weight percent (wt. %) to about 30 wt. % of the capsule based on the weight of the entire capsule, with the core components comprising the balance. To achieve sufficient color intensity in written markings, the color-changing ink compositions typically include at least about 30 wt. %, at least about 40 wt. %, at least about 50 wt. %, for example, in a range of about 20 wt. % to about 60 wt. %, or about 30 wt. % to about 50 wt. %, or about 35 wt. % to about 45 wt. % of the color-changing capsules based on the total weight of the color-changing ink composition.

The shell is preferably frangible and thus fabricated to rupture rather than plastically deform when pressure is applied thereto. The shell does not typically rupture into multiple fragments but does rupture (or burst) upon application of pressure such that the components therein are exposed to atmospheric conditions. As a result, upon application of a force directing component to a written mark made with an ink composition comprising color-changing capsules, a portion of the color-changing capsules are ruptured, thereby allowing the eradicable dye of the color-changing capsules to react with the eradicator of the carrier.

A typical force directing component comprises an eraser such as those conventionally used in conjunction with writing instruments. Any material capable of directing a force to a substrate including but not limited to (relatively harder) thermoplastic materials, thermoplastic elastomers, metals, and wood can be used. Preferably, the capsules rupture under a force of less than about 25 psi (172.4 kilopascals), less than about 20 psi (137.9 kilopascals), and/or less than 10 psi (69.0 kilopascals). Of course, the capsules are typically manufactured such that a user would easily be able to apply the force directing component to a written mark made with an ink composition including the irreversible color-changing capsules to easily break apart the capsules.

The shell is typically formed of a polymer. The shell can be formed of polymeric and/or non-polymeric materials including but not limited to gum arabic, gelatin, ethylcelluloses, poly(lactide)s, poly(lactide-glycolide)s (i.e., poly(lactic-co-glycolic acid), urea-formaldehyde condensates, and maltodextrins. Additional exemplary polymers for the shell include but are not limited to polyureas, polyamides, polyesters, polyurethanes, mixtures thereof, and other similar polycondensation products, which may have optionally incorporated within their polymer structures certain soft and flexible segments such as polyether or polymethylene moieties.

The shell material may influence which microencapsulation techniques would be most efficient for forming the color-changing capsules. Suitable encapsulation processes include known chemical and physical methods for forming polymeric capsules. Representative examples of chemical methods include complex coacervation, interfacial polymerization (IFP), polymer-polymer incompatibility, in-situ polymerization, centrifugal force process, and submerged nozzle process. Representative examples of physical methods include spray drying, fluid bed coating, centrifugal extrusion, and rotational suspension separation. The selected encapsulation method depends on the requirement of the color-changing capsule size, which in turn is dependent on the application method and applicator (as explained in further detail below).

In a representative coacervation process, the core component(s) which is to be encapsulated is typically emulsified or dispersed in a suitable dispersion medium. This medium is typically aqueous but involves the formation of a polymer rich phase. Most frequently, this medium is a solution of the intended capsule wall material. The solvent characteristics of the medium are changed such as to cause phase separation of the wall material. The wall material is thereby contained in a liquid phase which is also dispersed in the same medium as the intended capsule core material. The liquid wall material phase deposits itself as a continuous coating about the dispersed droplets of the internal phase or capsule core material. The wall material is then solidified. U.S. Pat. No. 7,736,695 discloses such a process and is incorporated herein by reference in its entirety.

In a representative interfacial polymerization process, a microcapsule wall of a polyamide, an epoxy resin, a polyurethane, a polyurea or the like is formed at an interface between two phases. In interfacial polymerization, the materials to form the capsule wall are in separate phases, one in an aqueous phase and the other in a fill phase. Polymerization occurs at the phase boundary. Thus, a polymeric capsule shell wall forms at the interface of the two phases thereby encapsulating the core material. Wall formation of polyester, polyamide, and polyurea capsules typically proceeds via interfacial polymerization. U.S. Pat. No. 4,622,267, the entirety of which is incorporated herein by reference, discloses a representative interfacial polymerization technique for preparation of microcapsules in which the core material is initially dissolved in a solvent and an aliphatic diisocyanate soluble in the solvent mixture is added. Subsequently, a nonsolvent for the aliphatic diisocyanate is added until the turbidity point is just barely reached. This organic phase is then emulsified in an aqueous solution, and a reactive amine is added to the aqueous phase. The amine diffuses to the interface, where it reacts with the diisocyanate to form polymeric polyurethane shells. A similar technique, used to encapsulate salts which are sparingly soluble in water in polyurethane shells, is disclosed in U.S. Pat. No. 4,547,429, also incorporated herein by reference in its entirety.

U.S. Pat. No. 3,516,941 teaches polymerization reactions in which the material to be encapsulated, or core material, is dissolved in an organic, hydrophobic oil phase which is dispersed in an aqueous phase. The aqueous phase has dissolved materials for forming aminoplast resin which upon polymerization form the wall of the microcapsule. A dispersion of fine droplets of the oil phase is prepared using high shear agitation. Addition of an acid catalyst initiates the polycondensation forming the aminoplast resin within the aqueous phase, resulting in the formation of an aminoplast polymer which is insoluble in both phases. As the polymerization advances, the aminoplast polymer separates from the aqueous phase and deposits on the surface of the dispersed droplets of the oil phase to form a capsule wall at the interface of the two phases, thus encapsulating the core material. This process produces the microcapsules. Polymerizations that involve amines and aldehydes are known as aminoplast encapsulations. Urea-formaldehyde (UF), urea-resorcinol-formaldehyde (URF), urea-melamine-formaldehyde (UMF), and melamine-formaldehyde (MF), capsule formations proceed in a like manner.

The shell can be formed, for example, by polymerizing oil-soluble monomers (precursors). Depending on the process, the oil soluble shell forming precursors present in the microdroplet phase during the microencapsulation process are preferably comprised of diisocyanates, diacyl chloride, and bischloroformate having soft and flexible moieties such as polymethylene or polyether segments within their molecular structures. Optionally, appropriate polyfunctional crosslinking agents, such as triisocyanate or triacyl chloride, in effective amounts, such as, for example, from about 1 weight percent to about 25 weight percent, can also be added to generate crosslinked shell polymers to improve their mechanical strength. Illustrative examples of the shell precursors include the polyether-based polyisocyanate such as Uniroyal Chemical's diphenylmethane diisocyanate-based liquid polyether VIBRATHANES® B-635 and B-843 and toluene diisocyanate-based liquid polyether VIBRATHANES® B-604 and B-614, and Mobay Chemical Corporation's liquid polyether isocyanate prepolymers (E-21,E-21A, 743, 744), adipoyl chloride, fumaryl chloride, suberoyl chloride, succinyl chloride, phthaloyl chloride, isophthaloyl chloride, terephthaloyl chloride, ethylene glycol bischloroformate, diethylene glycol bischloroformate, and triethylene glycol bischloroformate. In addition, other polyfunctional reagents can also be added as co-reactants to improve shell properties such as mechanical strength and pressure sensitivity. In one embodiment, the aforementioned co-reactants can be selected from the group consisting of benzene diisocyanate, toluene diisocyanate, diphenylmethane diisocyanate, 1,6-hexamethylene diisocyanate, bis (4-isocyanatocyclohexyl)methane, polyisocyanates, for example, MONDUR® CB-60, MONDUR® CB-75, MON- DUR® MR, MONDUR® MRS 10 (Mobay Chemical Corporation), polymethylene polyphenylisocyanates, for example, PAPI® 27, and PAPI® 135 (Dow Chemical Company), modified diphenylmethane diisocyanates, for example, ISONATE® 143L, ISONATE® 181, ISONATE® 125M, ISONATE® 191, and ISONATE® 240 (Dow Chemical Company).

The shell can also be formed, for example, by polymerizing water-soluble monomers. Water-soluble shell forming monomer components can be added to an aqueous phase including polyamine or polyol including bisphenol. Illustrative examples of the water-soluble shell monomers include ethylenediamine, tetramethylenediamine, pentamethylenediamine, 2-methylpentamethylene diamine, hexamethylenediamine, p-phenylenediamine, m-phenylenediamine, 2-hydroxy trimethylenediamine, diethylenetriamine, triethylenetetraamine, tetraethylenepentaamine, 1,8-diaminooctane, xylylene diamine, bis(hexamethylene)triamine, tris(2-aminoethyl)amine, 4,4'-methylene bis(cyclohexylamine), bis(3-aminopropyl)ethylene diamine, 1,3-bis(aminomethyl) cyclohexane, 1,5-diamino-2-methylpentane, piperazine, 2-methylpiperazine, 2,5-dimethylpiperazine, 1,4-bis(3-aminopropyl) piperazine, and 2,5-dimethylpentamethylene diamine, bisphenol A, and bisphenol Z. When desired, a water soluble crosslinking component such as triamine or triol can also be added in effective amounts sufficient to introduce crosslinking into the shell polymer structure to enhance its mechanical strength.

In each of the foregoing techniques, capsule thickness can be controlled in view of the (intended) final capsule size and pressure needed to rupture the capsule. If the capsule wall thickness is too high such that it results in a relatively large particle size (at least with respect to the system used to apply an ink composition containing the capsule), the color-changing capsule may not be able to pass through the writing point or fibrous reservoir of a writing instrument containing the color-changing ink. On the other hand, if the shell thickness is too little, the capsule may be ruptured prematurely during the ink deposition process. Persons having ordinary skill in this art are able to balance these considerations appropriately. The color-changing capsule shells typically have a wall thickness generally, for example, of less than about 5 microns, but greater than about 0.5 microns, for example, between about 0.5 microns and 2 microns.

The particle size (or diameter) of the capsule can vary in different applications. For example, for color-changing ink compositions for use in ball pens, color-changing capsules having a diameter of between about 0 microns and about 5 microns, between about 0 microns and about 3 microns, and/or between about 0 microns and 1 micron are highly desirable. For color-changing ink compositions for use in markers, color-changing capsules having a diameter between about 1 micron and about 30 microns, between about 3 microns and about 25 microns, and/or between about 5 microns and about 15 microns can be used. For color-changing ink compositions for use with stamps, capsules having a diameter in excess of 100 microns are typically preferred, for example, color-changing capsules having a diameter between about 100 microns and about 500 microns.

Eradicable Dye

The core contains at least an eradicable dye. The core can also include a solvent, a resin, or mixtures thereof. As used herein, the term "eradicable dye" refers to a dye that can exhibit a first color in the color-changing capsule and exhibit a second color or become substantially colorless when exposed to an eradicator. As a result, the eradicable dye is initially in its colored form. The color change from colored to a second color and/or substantially colorless can result from electron transfer and/or proton transfer reactions. Eradicable colorants typically change color or become substantially colorless within about 60 minutes, or 5 minutes, or 60 seconds and/or 30 seconds after coming into contact with an eradicator. As described in greater detail below, nonlimiting examples of eradicable colorants include eradicable dyes such as pH indicators, triarylmethane dyes, diarylmethane dyes, methine dyes, and eradicable pigments.

Eradicable pH indicators are pH sensitive colorants that are designed to change color upon a change in pH, usually via an acid-base reaction which alters the chromophore of the indicator. See, Bishop, E., Indicators, Pergamon, Oxford, 1972, the disclosure of which is hereby incorporated by reference. The eradicable pH indicators may be colored before the application of an eradicator fluid, and change color and/or become substantially colorless after coming into contact with an eradicator. Thus, in some embodiments, the pH indicator will be colored at neutral pH and the eradicator composition will comprise an acid or base. Upon rupture of the color-changing capsules of a written marking, the colored pH indicator dye will come into contact with an appropriate acid or base eradicator, thereby rendering the written marking a second color and/or substantially colorless. Conversely, in other embodiments, the eradicable dyes may be dyes that are typically colored under either basic or acidic conditions, and change from colored to a second color and/or substantially colorless upon a change in pH. In embodiments wherein the eradicable dyes are colored under basic or acidic conditions, the core of the color-changing capsule also comprises a pH adjuster. Upon rupture of the capsules of a written marking, the contents of the core come in contact with either a base or an acid that functions as an eradicator, changing the local pH, thereby rendering the written marking substantially colorless. A pH adjuster may be volatile or non-volatile. Basic compounds that can serve as pH adjusters include but are not limited to compounds such as sodium hydroxide, 2-amino-2-methyl-1-propanol, ammonia, and the like. Acidic compounds that can serve as pH adjusters include but are not limited to phosphoric acid, hydrochloric acid, citric acid and the like. A pH adjuster optionally may be present in an ink in an amount of about 0.01 wt. % to about 20 wt. % based on the total weight of the ink.

Suitable indicators include the following dyes (the approximate operable pH range at which the indicator changes from substantially colorless to colored or from a first color to a second color are given in parentheses; some dyes have two different color transitions): Alizarin (5.6-7.2; 11.0-12.4); Alizarin Red S (4.3-6.3); Alizarin Yellow R (10.1-12.0); Benzopurpurine 4B (2.2-4.2); 4,4'-bis(2-amino-1-naphthylazo)-2,2'-stilbenedisulfonic acid (3.0-4.0); 4,4'-bis(4-amino-1-naphthylazo)-2,2'-stilbenedisulfonic acid (8.0-9.0); Brilliant Yellow (6.6-8.0); Bromocresol Green (3.8-5.4); Bromocresol Purple (5.4-6.8); Bromophenol Blue (3.0-4.6); Bromothymol Blue (6.0-7.0); Chlorophenol Red (5.2-8.8); Clayton Yellow (12.2-13.2); Congo Red (3.0-5.2); o-cresolphthalein (7.8-9.8); Eosin B (1.4-2.4); Eosin Y (0.0-3); Quinaldine Red (1.0-3.2); Cresol Red (0.0-1.0; 7.0-8.8); Crystal Violet (0.0-1.8); Curcumin (Turmeric) (10.2-11.8); p-(2,4-dihydroxyphenylazo)benzenesulfonic acid, sodium salt (111.4-12.6); p-dimethylaminoazobenzene (2.8-4.4); 4-(4-dimethylamino-1-naphylazo)-3-methoxybenzenesulfonic acid (3.5-4.8); 2-(p-dimethylaminophenylazo)pyridine (0.2-1.8; 4.4-5.6); N,N-dimethyl-p-(m-tolylazo)analine (2.6-4.8); 2,4-dinitrophenol (2.0-4.7); 2-(2,4-dinitrophenylazo)-1-naphthol-3,6-disulfonic acid, disodium salt (6.0-7.0); 6,8-dinitro-2,4-(1H)quinazolinedione (6.4-8.0); Erythrosin, disodium salt (2.2-3.6); 4-(p-exthoxyphenylazo)-m-phenylene-diamine monohydrochloride (2.2-5.8); ethyl bis(2,4-dimethylphenyl)ethanoate (8.4-9.6); Ethyl Orange (3.2-4.8); Ethyl Red (4.0-5.8); Ethyl Violet (0.0-2.4); 5,5'-indigodisulfonic acid, disodium salt (11.4-13.0); Malachite Green (0.2-1.8); Metacresol Purple (1.2-2.8; 7.4-9.0); Metanil Yellow (1.2-2.4); Methyl Green (0.2-1.8); Methyl Orange (3.2-4.4); Methyl Red (4.8-6.0); Methyl Violet (0.0-1.6); p-naphtholbenzein (8.2-10.0); Neutral Red (6.8-8.0)1 o-nitrophenol (5.4-6.6); m-nitrophenol (6.8-8.6); Orange IV (1.4-2.8); Paramethyl Red (1.0-3.0); phenolphthalein (8.2-9.8); Phenol Red (6.6-8.0); 4-phenylazodiphenylamine (1.2-2.6); 4-phenylazo-1-naphthylamine (4.0-5.6): Propyl Red (4.8-6.6); Quinaldine Red (1.4-3.2); Resazurin (3.8-6.4); Resorcin Blue (4.4-6.2); tetrabromophenophthalein ethyl ester, potassium salt (3.0-4.2); Thymol Blue (1.2-2.8; 8.0-9.6); thymolphthalein (9.4-10.6); 4-o-tolylazo-o-toluidine (1.4-2.8); 1,3,5-trintrobenzene (12.0-14.0); and 2,4,6-trinitrotoluene (11.5-13.0). Suitable color change dyes that are colored under basic conditions include but are not limited to phthalein-type dyes such as o-cresolphthalein, phenolphthalein, and thymolphthalein, phenol-type dyes such as m-nitrophenol and p-nitrophenol, cyanine, and bis-(2,4-dinitro-phenyl)acetic acid ethyl ester. Suitable color change dyes that are colored under acidic conditions include but are not limited to phthalide-type color-forming dyes such as diarylphthalide dyes and indolylphthalide dyes, fluoran dyes, leuco dyes such as acylleucoazine dyes and leucoauramine dyes, spiropyrane dyes, rhodaminelactam dyes, triarylmethane dyes, and chromene dyes. Suitable color change dyes that are colored under acidic conditions are commercially available under the PERGASCRIPT® trade name (Ciba-Geigy Corporation, Greensboro, N.C.) and under the COPIKEM® trade name (Hilton Davis Company, Cincinnati, Ohio). Preferred color change dyes include crystal violet lactone, malachite green lactone, PERGASCRIPT® red I-6B (a bis-indolyl phthalide dye), PERGASCRIPT® black I-2R (a diamino fluoran dye), PERGASCRIPT® I-2G (a xanthene dye), COPIKEM® 1 Blue CVL, Vermilion-DCF (Hodogaya Chemical (USA) Inc.), Red-DCF (Hodogaya Chemical (USA) Inc.), and Orange-DCF (Hodogaya Chemical (USA) Inc.).

Eradicable dyes containing a triphenylmethane moiety or a methine moiety are commonly used eradicable dyes. It is believed that the active colored dye is able to reflect color in the visible range (between 380 nm to 780 nm) because of the conjugation of the aromatic rings in the molecule. Examples of suitable conjugated eradicable dyes include but are not limited to Auramine O, Basic Yellow 2, Thiazole Orange, Basic Yellow 11, Basic Yellow 13, Basic Yellow 21, Basic Yellow 28, Basic Yellow 29, Basic Yellow 40, Basic Yellow 49, Acid Blue 22, Acid Blue 83, Acid Blue 90, Acid Blue 93, Acid Fuchsin, Acid Green, Acid Green 3, Acid Green 5, Acid Green 9, Acid Magenta, Acid Roseine, Acid Rubin, Acid Violet 17, Acid Violet 19, Acid Violet 49, Alizarol Cyanin R, Aluminon, Aniline Blue Ws, Basic Blue 8, Basic Blue 15, Basic Blue 20, Basic Blue 26, Basic Fuchsin, Basic Green 4, Basic Red 9, Basic Red 13, Basic Red 14, Basic Red 15, Basic Red 29, Basic Red 46, Basic Violet 2, Basic Violet 3, Basic Violet 4, Basic Violet 14, Chrome Violet Cg, Chromoxane Cyanin R, Cotton Blue, Crystal Violet, Dahlia, Diamond Green B, Eriochrome Cyanin R, Ethyl Green, Ethyl Violet, Fast Green Fcf, Food Green 3, Gentian Violet, Helvetia Blue, Hoffman's Violet, Light Green, Lissamine Green Sf, Magenta 0, Magenta I, Magenta II, Magenta III, Malachite Green, Methyl Blue, Methyl Green, Methyl Violet, Methyl Violet 2b, Methyl Violet 10b, Mordant Blue 3, Mordant Violet 39, New Fuchsin, Night Blue, Acid Orange 10, Acid Orange 21, Pararosanilin, Primula, Rosanilin, Solochrome Cyanin R, Victoria Blue 4r, Victoria Blue B, Victoria Green B, Water Blue I, or a combination thereof. Preferably, the dye is Acid Green 3, Acid Blue 93, Acid Blue 90, Acid Violet 19, Acid Violet 17, Basic Red 13, Basic Red 14, Basic Yellow 49, or a combination thereof. Oxidizing agents and/or reducing agents are generally used as eradicators to eradicate eradicable dyes containing a triphenylmethane moiety or a methine moiety, as described in further detail below.

Typically, the irreversible color-changing ink compositions include at least 1 wt. %, at least 5 wt. % and/or at least 10 wt. % of the eradicable dye in the ink composition, based on the total weight of the irreversible color-changing ink composition. For example, the amount of eradicable dye present in the irreversible color-changing ink composition is typically in a range of about 0.05 wt. % to about 50 wt. %, or about 0.07 wt. % to about 30 wt. %, or about 1 wt. % to about 25 wt. %, or about 2.5 wt. % to about 20 wt. %, or about 5 wt. % to about 17.5 wt. % based on the total weight of the irreversible color-changing ink composition. The amount of eradicable dye in the ink composition may be upwardly adjusted in view of the transparency of the color-changing capsule shell, if relatively poor.

The irreversible color-changing pigment capsules typically include a solvent to solvate the eradicable dye. The core solvent should be selected so as not to solvate the color-changing pigment capsules.

Generally, the core solvent is not limited and may be aqueous, organic, polar, or non-polar provided that the color change dye is sufficiently soluble therein and that the solvent does not solvate the capsule. Representative solvents include but are not limited to hydrocarbons and halo-substituted hydrocarbons. Exemplary hydrocarbons include volatile branched chain hydrocarbons having from about 4 to about 30 carbon atoms, or from about 4 to about 20 carbon atoms, or preferably from about 6 to about 20 carbon atoms. Such hydrocarbons include, for example, isoparaffins commercially available from Exxon Chemical Company (Baytown, Tex. U.S.A.), as Isopar M (C13-C14 Isoparaffin), Isopar C (C7-C8 Isoparaffin), Isopar E (C8-C9 Isoparaffin), Isopar G (C10-C11 Isoparaffin), Isopar L (C11-C13 Isoparaffin), Isopar H(C11-C12 Isoparaffin). Other non-limiting examples of suitable branched chain hydrocarbons are commercially available from Presperse, Inc. (South Plainfield, N.J.) as Permethyl 99A (isododecane), Permethyl 102A (isoeicosane), and Permethyl 101A (isohexadecane). Other non-limiting examples of suitable branched chain hydrocarbons include petroleum distillates such as those available from Phillips Chemical as Soltrol 130, Soltrol 170, and those available from Shell as Shell Sol 70, Shell Sol 71, and Shell Sol 2033. Additional suitable hydrocarbons include dodecane, octane, decane, hydrogenated polyisobutanes and combinations thereof. For example, the Norpar series of paraffins available from Exxon Chemical Company such as Norpar 12, Norpar 13, and Norpar 15 can be used as the carrier solvent. Yet another example includes C11-C15 alkanes/cycloalkanes, such as those available from Exxon as ExxSol™ D80.

Carrier

The irreversible color-changing pigment capsules are dispersed in a carrier, the carrier most often comprising a solvent. The carrier may be provided in the form of an emulsion. An emulsion can generally be defined as a significantly stable suspension (from seconds to years) of particles of liquid of certain size within a second immiscible liquid. See Milton, Surfactants and Interfacial Phenomena, $3^{rd}$ ed., Wiley-Interscience, New Jersey. One liquid (the dispersed phase) is dispersed in the other liquid (the continuous phase). Typically, one of the dispersed and continuous phases is an oily or relatively non-polar phase and the other is an aqueous or relatively polar phase. Such emulsions include but are not limited to macroemulsions (particle size diameter between about 500 nm and about 50,000 nm), mini- or nano-emulsions (particle size diameter between about 100 nm and about 500 nm), and microemulsions (particle size diameter between about 10 nm and about 100 nm).

When the term "water," "water-like," or "aqueous" are used herein to describe either a solvent or a continuous phase, a dispersed phase, or an aqueous phase, it is understood that relatively polar solvents (or mixtures thereof) are contemplated in addition to or entirely in place of water itself. Similarly, when the terms "oil" or "oily" are used herein to describe a solvent, or a continuous phase, a dispersed phase, or an oil phase, it is understood that relatively non-polar solvents (or mixtures thereof) are contemplated in addition to or in place of oil itself. The possible combinations of solvent components for formation of the various emulsions in accordance with the invention can easily be determined by those of ordinary skill.

Emulsions can also generally be classified as oil-in-water (O/W) emulsions or water-in-oil (W/O) emulsions, but in some instances such emulsions can be further classified as multiple emulsions such as water-in-oil-in-water (W/O/W) emulsions, and/or oil-in-water-in-oil (O/W/O) emulsions. As used herein, the term "O/W emulsion" includes any emulsion wherein an oil or relatively non-polar phase is dispersed in an aqueous or relatively polar phase. Similarly, the term the term "W/O emulsion" includes any emulsion wherein an aqueous or relatively polar phase is dispersed in an oil or relatively non-polar phase. Notwithstanding the foregoing definitions and description, the term emulsion as used herein also includes bicontinuous emulsions wherein both (1) the aqueous or polar phase and (2) the oily or non-polar phases are continuous phases. Bicontinuous emulsions are sometimes referred to in the scientific literature as Winsor type IV microemulsions. The irreversible color-changing inks according to the disclosure include but are not limited to any of the foregoing emulsions.

Typically, when provided as an emulsion, the carrier emulsion of the disclosure will be a water-in-oil emulsion. The color-changing capsules are dispersed in the continuous phase of the emulsion (regardless of the specific type of emulsion). Thus, the continuous phase solvent should be selected so as not to solvate the color-changing pigment capsules. When oil or a relatively non-polar solvent is used as the continuous phase, the ink compositions can advantageously be used on water-sensitive substrates. Another advantage is that such systems allow one to include water compatible (but oil incompatible) ingredients, such as aqueous/aqueous soluble eradicators, in the irreversible color-changing ink compositions in addition to reducing/eliminating ink settling/separation related problems caused by having two different phases.

Generally, the continuous phase is not limited and may be aqueous, organic, polar, or non-polar provided that the solvent does not solvate the color-changing capsule. Representative organic solvents include but are not limited to mineral oils, silicone oils, hydrocarbons and halo-substituted hydrocarbons. Exemplary hydrocarbons include volatile branched chain hydrocarbons having from about 4 to about 30 carbon atoms, preferably from about 4 to about 20 carbon atoms, more preferably from about 6 to about 20 carbon atoms. Such hydrocarbons include, for example, isoparaffins commercially available from Exxon Chemical Company (Baytown, Tex. U.S.A.), as Isopar M (C13-C14 Isoparaffin), Isopar C (C7-C8 Isoparaffin), Isopar E (C8-C9 Isoparaffin), Isopar G (C10-C11 Isoparaffin), Isopar L (C11-C13 Isoparaffin), Isopar H(C11-C12 Isoparaffin). Other non-limiting examples of suitable branched chain hydrocarbons are commercially available from Presperse, Inc. (South Plainfield, N.J.) as Permethyl 99A (isododecane), Permethyl 102A (isoeicosane), and Permethyl 101A (isohexadecane). Other non-limiting examples of suitable branched chain hydrocarbons include petroleum distillates such as those available from Phillips Chemical as Soltrol 130, Soltrol 170, and those available from Shell as Shell Sol 70, Shell Sol 71, and Shell Sol 2033. Additional suitable hydrocarbons include dodecane, octane, decane, hydrogenated polyisobutanes, hexanes (e.g., methylcyclohexane), heptanes, decanes, hexadecanes, octadecanes, VM&P Naptha solvents, and similar solvents, and aromatic solvents including but not limited to benzenes, toluenes, and similar solvents and combinations thereof. For example, the Norpar series of paraffins available from Exxon Chemical Company such as Norpar 12, Norpar 13, and Norpar 15 can be used as the continuous phase solvent. Yet another example includes C11-C15 alkanes/cycloalkanes, such as those available from Exxon as ExxSol™ D80.

Exemplary solvents for the water or relatively polar phase include but are not limited to water, ethylene glycol, propylene glycol, glycol ethers including but not limited to ethylene glycol monomethyl ether, ethylene glycol monoethyl ether, ethylene glycol monobutyl ether, ethylene glycol monophenyl ether, propylene glycol monomethyl ether, propylene glycol monoethyl ether, propylene glycol monobutyl ether, propylene glycol monophenyl ether, and similar solvents, alcohols including but not limited to ethanol, propanols, butanols, octanols, and similar solvents, and mixtures thereof.

Eradicator

The eradicator can be emulsified into the carrier as a W/O emulsion or an O/W emulsion. Typically, the eradicator is emulsified into the carrier as a water-in-oil emulsion. In a water-in-oil emulsion, the continuous, non-polar, phase will include the color-changing capsule comprising the eradicable dye and the dispersed, polar, phase will contain the eradicator. As previously mentioned, eradicators suitable for use in the disclosed irreversible color-changing ink compositions are generally chemical compounds including but not limited to oxidizing agents, reducing agents, and acid-base reactants.

The eradicator will be capable of making the eradicable dye substantially colorless and/or change colors if the two compositions come into contact with each other.

In embodiments wherein the eradicable dye is a pH indicator, the eradicator will generally be an acid or a base. If the eradicable dye is colored due to conjugation, an eradicator (e.g., an oxidizing agent such as sodium hypochlorite) destroys the conjugation of the dye. Once this change in hybridization takes place, the conjugation between the various rings of the dye molecule is lost and the dye molecule becomes substantially colorless and/or changes color. Other eradicators including, but not limited to, reducing agents (e.g., sodium sulfite), acids, bases, and mixtures thereof may also be applied to eradicable colorants so as to eradicate their colors. The eradicator is generally a basic nucleophilic anion associated with various salts including but not limited to sulfites, metasulfites, chlorites, and hydroxides. Typically, the counter cation is sodium, potassium, ammonium or other cations that allow substantial dissolution of this salt in the solvent of choice. For example, if the eradicable dye includes triphenylmethine dye, the eradicator is preferably a sulfite or a metasulfite. If the eradicable dye is an acid dye, the eradicator is preferably a hypochlorite (e.g., CLOROX™ bleach).

Suitable oxidizing agents include acids selected from the group consisting of mineral acids, organic acids, and combinations thereof. The acid oxidizing agent can be a strong acid or weak acid, or a combination thereof. The acid oxidizing agent can also be selected from the group consisting of monobasic acids, di-basic acids, tri-basic acids, tetra-basic acids, and combinations thereof. Mineral acids include but are not limited to hydrochloric acid, hydrobromic acid, hydroiodic acid, hydrofluoric acid, nitric acid, sulfuric acid, carbonic acid, chromic acid, phosphoric acid, phosphorous acid, phosphonic acid, and combinations thereof. Organic acids include but are not limited to benzoic acid, lactic acid, acetic acid, propanoic acid, acetoacetic acid, crotonic acid, formic acid, glycolic acid, glyoxylic acid, lactic acid, pyruvic acid, transaconitic acid, fumaric acid, maleic acid, malic acid, tartaric acid, acetylenedicarboxylic acid, tetrahydrophthalic acid, mesaconic acid, phthalic acid, isophthalic acid, terephthalic acid, itaconic acid, trans-ethyleneoxidedicarboxylic acid, succinic acid, adipic acid, pimellic acid, suberic acid, azelic acid, substituted phosphoric acid, substituted phosphorous acid, citric acid, hemimellitic acid, trimellitic acid, trimesic acid, 2-carboxyethyliminodiacetic acid, nitrilotriacetic acid, phosphonic acid, substituted phosphonic acid, mellophanic acid, prehnitic acid, pyromellitic acid, 2-phosphonoethyliminodiacetic acid, dithylenetetraacetic acids, and combinations thereof. The oxidizing agent is preferably miscible or soluble in water, and the oxidizing agent is preferably an aqueous mixture.

Typically, the irreversible color-changing ink compositions include at least 1 wt. %, at least 5 wt. %, at least 10 wt. % and/or at least 20 wt. % of the eradicator in the ink composition based on the total weight of the irreversible color-changing ink composition. For example, the amount of eradicator included in the irreversible color-changing ink is typically in a range of about 1 wt. % to about 55 wt. %, about 5 wt. % to about 50 wt. %, and/or about 10 wt. % to about 45 wt. % based on the total weight of the irreversible color-changing ink. To achieve a substantial degree of eradication, the weight ratio of eradicator to eradicable dye is preferably at least 1:1, for example, at least 2:1 and/or at least 4:1 in the irreversible ink compositions.

To prevent subsequent reformation of the eradicable dye chromophore by reduction, other additives including but not limited to reduction stabilization agents such as urea may be added. Reduction stabilization agents are typically contained in an amount less than about 10 wt. % of the total formulation. For example, in various embodiments, the color-changing ink contains about 0.01 wt. % to about 10 wt. % of the reduction stabilization agent.

To stabilize the basic nucleophilic anion of an eradicator, stabilizers including but not limited to ethylenediaminetetraacetic acid (usually in form of a sodium salt) can be added. The loading of such stabilizer typically is between about 0.1 wt. % and about 30 wt. % of the total formulation.

Additives

All ink compositions disclosed herein can include other additives. Preferred additives include, for example, emulsifying agent(s), non-eradicable pigment(s) or non-eradicable dye(s) (as previously described), biocide(s), surface tension modifier(s), synergistic resin(s), surfactant(s), humectants(s), dispersing agents(s), and other additives known in the art. These additives can be added to the ink composition and/or included in the core of the color-changing capsules. The additives can be added in any amount such that the overall performance of the ink compositions is not adversely affected in any aspect.

Emulsifying agents such as surface active substances can significantly increase the kinetic stability of emulsions, thereby facilitating long term storage. The emulsifying agent is generally more soluble in the continuous phase.

The emulsifying agent is generally selected from surface active substances including but not limited to surfactants, wetting agents, and dispersing agents. Other substances, which stabilize emulsions, including but not limited to alumina particles, silica particles, bentonite particles, magnesium aluminum silicate particles, fat crystals, magnesium oxide particles, magnesium trisilicate particles, coated titanium dioxide particles, tin oxide particles, may also be used. Typically, the particles are at least 10-fold, at least 50-fold, at least 100-fold, or at least 1000-fold smaller than the emulsified droplets. The emulsifying agent is present in an amount (or concentration) needed to effectively stabilize the emulsified components of the ink compositions.

Suitable emulsifying agents which may be used to stabilize the water-in-oil emulsions are surfactants including but not limited to LAMEFORM® TGI, MONOMULS 90-018®, DEHYMULS® PGPH, DEHYMULS® HRE7, EMEREST® 2712, and EMEREST® 2452 (Cognis, Ohio); BRIJ® 93 VEG, SPAN® 80, ATLOX® 4912, HYPERMER® B246SF (Uniqema, Del.), and mixtures of such surfactants. Of course, any other surface active substances that stabilize oil-in-water emulsions may also be used.

In some embodiments, the irreversible color-changing ink composition will include one or more additional, non-eradicable colorants including but not limited to pigments and dyes. The additional colorant can be included in the carrier in the continuous phase or in the emulsified/dispersed phase. In embodiments wherein the additional colorant is included in the dispersed phase, the colorant can be emulsified into the carrier as a W/O emulsion or a O/W emulsion.

Pigment dispersions for use to provide water-in-oil emulsions in which the pigment is emulsified into the continuous phase (possibly in addition to the eradicator) can either be prepared or purchased (commercially available pigment dispersions). Representative commercially available pigment dispersions in water and/or a relatively polar solvent suitable for incorporation into ink compositions and water-in-oil emulsions in accordance with the disclosure include but are not limited to pigment dispersions available under the TINT-AYD® trade name including TINT-AYD® WD and TINT-AYD® CW products (Elementis Specialty, NJ), the CAB-O-JET® trade name (Cabot Corporation, MA), and the XFAST™ trade name (BASF Corporation, NJ).

Alternatively, pigment dispersions for use in the irreversible color-changing ink compositions in which the pigment is emulsified into the continuous phase (possibly in addition to the eradicator) as a water-in-oil emulsion can be prepared by dispersing one or more pigments in water and/or other relatively polar solvent. The pigment dispersions can optionally include a polymer and/or a dispersing agent. Many of the pigments (e.g., metallic pigments and pearlescent pigments) do not require special treatment to form a dispersion and can instead be prepared by mixing with water and any desired additives.

Suitable pigments which can be used to prepare pigment dispersions for use in the irreversible color-changing ink compositions containing water-in-oil emulsions include but are not limited to titanium dioxide pigments, e.g., titanium dioxide pigments available under the TIPURE® trade name (Du Pont de Nemours, Del.), the KRONOS™ trade name (Kronos Inc, Houston, Tex.), and the TIOXIDE® trade name (Huntsman Tioxide, IL). Preferred titanium pigments include TIPURE® R-706, TIPURE® R-902, TIPURE® R-931, KRONOS™ 2310, KRONOS™ 2131, KRONOS™ 2044, TIOXIDE® R-XL, TIOXIDE® TR50, and TIOXIDE® TR93, but of course other titanium pigments may also be used.

Additionally, organic pigments may be emulsified into the irreversible color-changing ink compositions. Suitable organic pigments include but are not limited to red, green, blue, yellow, orange, and carbon black pigments (BASF Corporation, NJ; Clariant Corporation, NC; Emerald Hilton Davis, Ohio; Ciba Specialty Chemicals, Switzerland; Degussa Corporation, NJ; Cabot Corporation, MA; and, Columbian Chemicals Company, GA). Of course, any suitable organic pigment may be used.

Additionally, pearlescent and other special effect pigments may be emulsified into the irreversible color-changing ink compositions (BASF Corporation, NJ; Ciba Specialty Chemicals, Switzerland; and Taizhu, China).

Other pigments including but not limited to inhibited, protected, or coated metallic pigments may also be emulsified into the irreversible color-changing ink compositions. Exemplary coated metallic pigments include coated aluminum pigments and coated bronze pigments (Schlenk-BOTH Metallic Pigments, MA; Wolstenholme International Inc., IL; Silberline Manufacturing Co., Inc., PA; Zuxing Enterprise Co., Ltd., China; and, Echart GmbH & Co. KG, Germany).

Inorganic colored pigments may also be emulsified into irreversible color-changing ink compositions. Preferred inorganic colored pigments include but are not limited to colored titanium dioxide pigments available under the TICO™ trade name (Heubach, Germany) and colored mixed metal oxides inorganic pigments (Heubach, Germany and Cerdec Corporation, PA). Other suitable inorganic colored pigments such as colored aluminum pigments can also be used (Showa Aluminum Powder, K.K., Japan).

Suitable pigment dispersing agents for preparing pigment dispersions for forming W/O emulsions of irreversible color-changing ink compositions are compatible with water and/or relatively polar solvents. Exemplary dispersing agents and/or dispersing polymers include but are not limited to such dispersing agents sold under the NUOSPERSE™ trade name including NUOSPERSE™ W-30, NUOSPERSE™ 2000, and NUOSPERSE™ FA 196 (Elementis Specialty, NJ), the ZETASPERSE® trade name, for example, ZETASPERSE® 1200, ZETASPERSE® 1400, ZETASPERSE® 1600, ZETASPERSE® 2100, ZETASPERSE® 2300 (Air Products and Chemicals, Inc., PA) the HYDROPLAT® trade name (Cognis, Ohio), and dispersing acrylic polymers such as those available under the JONCRYL® trade name (BASF Corp., WI), and mixtures thereof.

Optionally, a binder resin can be included to impart smear resistance and water resistance to the irreversible color-changing ink. Binder resins for use in the irreversible color-changing ink according to the disclosure include polymers containing glycol repeating units (e.g., polyethylene glycol), polyvinylpyrrolidone (PVP), copolymers and salts thereof, polyvinylacetate (PVA), copolymers and salts thereof, and polyacrylic acids and copolymers and salts thereof, other film-forming, water-soluble resins, and combinations of the foregoing. The binder resin is typically selected from PVP and copolymers thereof, PVA and copolymers thereof, and combinations of the foregoing.

The binder resin, when present, can also be used to control the viscosity of the irreversible color-changing ink. When a highly viscous irreversible color-changing ink is desired (e.g., cP>10,000), the use of a larger amount of binder resin will achieve a highly viscous irreversible color-changing ink. When the binder resin used is a polymer (e.g., PVP), the resin can be selected with a wide range of viscosities and molecular weights. For example, PVP is commercially available at various viscosities and in a molecular weight range of 10,000 Daltons to 1,300,000 Daltons (Aldrich Chemical Co., Inc., Milwaukee, Wis.), for example. Thus, depending on the molecular weight of the polymer resin, there can be a great deal of variation in the amount of resin utilized in the irreversible color-changing ink, and the overall viscosity of the irreversible color-changing ink. When, for example, a low molecular weight PVP is used (about 10,000 to about 50,000 Daltons), the irreversible color-changing ink can achieve smear and water resistance while still maintaining a low viscosity (e.g., about 2 cps to about 5 cps). A binder resin is typically present in an amount in a range of about 1 wt. % to about 80 wt. % based on the total weight of the irreversible color-changing ink, or about 5 wt. % to about 20 wt. %.

Resins which are often relatively reactive can be excluded from the color-changing capsule core such that the core is substantially free of (dissolved/solvated) resin (e.g., the core contains less than about 1 wt. % resin, less than about 0.50 wt. % resin, less than about 0.25 wt. % resin, based on the total weight of the color-changing capsule).

Any polymer or polymer solution/dispersions which are compatible with the relatively non-polar continuous phases can be included in such irreversible color-changing ink compositions, especially polymers that are soluble in aliphatic hydrocarbon solvents. Suitable polymers include but are not limited to aliphatic hydrocarbon polymers such as those available under the NEVTAC® trade name (Neville Chemical Company, PA), hydrocarbon resins such as those available under the SYLVAPRINT® trade name (Arizona Chemical, FL), e.g., a terpene phenol resin SYLVAPRINT® 7002, hydrogenated hydrocarbon resins such as those sold under the ARKON™ trade name, (Arakawa Chemical (USA), IL) rosin modified phenolic resins such as those sold under the TAMANOL™ trade name (Arakawa Chemical (USA), IL), vinyl acrylic polymers such as those sold under the PLIOWAY® trade name including Ultra 200 and PLIOWAY® Ultra 350 (Eliokem, Akron, Ohio), acrylic resins such as NEOCRYL® B-705 (DSM NeoResin, MA); and DIANAL™ MB (Dianal America, Inc., TX), and mixtures thereof.

The disclosed irreversible color-changing ink compositions can be used in a variety of applicators or writing instruments. The writing instruments include a writing point in fluid communication with an ink reservoir. The ink reservoir contains an irreversible color-changing ink composition including a carrier and color-changing capsules dispersed in the carrier. Suitable writing instruments include, but are not limited to ball point pens, roller ball pens, gel pens, fountain pens, felt tip pens, markers, printers and print cartridges, and stamps.

Although the foregoing description is a detailed description of numerous different embodiments of irreversible color-changing ink compositions, the detailed description is to be construed as exemplary only and does not describe every possible embodiment of an irreversible color-changing ink composition in accordance with the disclosure.

What is claimed is:
1. An irreversible color-changing ink comprising:
a carrier and color-changing capsules dispersed in the carrier, the color-changing capsules comprising a shell and a core, the core comprising an eradicable dye capable of becoming substantially colorless and/or of changing color from a first colored state to a second colored state, wherein the carrier comprises an eradicator.

2. The irreversible color-changing ink according claim 1, wherein the eradicator is emulsified into the carrier as a water-in-oil emulsion or an oil-in-water emulsion.

3. The irreversible color-changing ink according claim 1, wherein the eradicator is dissolved or dispersed in the carrier and is selected from the group consisting of a base, an acid, an oxidizing agent, a reducing agent, and combinations thereof.

4. The irreversible color-changing ink according to claim 1, wherein the shell of the color-changing capsule comprises water-soluble polymers.

5. The irreversible color-changing ink according to claim 1, wherein the carrier further comprises a non-polar solvent.

6. The irreversible color-changing ink according to claim 1, wherein the carrier further comprises an additional non-eradicable colorant.

7. The irreversible color-changing ink according to claim 6, wherein the additional non-eradicable colorant is a pigment.

8. The irreversible color-changing ink according to claim 6, wherein the additional non-eradicable colorant is emulsified into the carrier as a water-in-oil emulsion or an oil-in-water emulsion.

9. The irreversible color-changing ink according to claim 1, wherein the eradicable dye is present in an amount of about 0.05 wt. % to about 50 wt. %, based on the total weight of the irreversible color-changing ink composition.

10. The irreversible color-changing ink according claim 1, wherein the eradicator is present in an amount of about 1 wt. % to about 55 wt. %, based on the total weight of the irreversible color-changing ink.

11. The irreversible color-changing ink according claim 1, wherein the weight ratio of eradicator to eradicable dye is at least 1:1.

12. The irreversible color-changing ink according to claim 1, wherein the color-changing capsules are present in an amount of about 20 wt. % to about 60 wt. %, based on the total weight of the color-changing ink composition.

13. The irreversible color-changing ink according claim 1, wherein the carrier further comprises a non-polar solvent, the eradicator is emulsified into the carrier as a water-in-oil emulsion, and the color-changing capsules comprise water-soluble polymers.

14. The irreversible color-changing ink according to claim 13, wherein the eradicable dye comprises an eradicable dye selected from the group consisting of an eradicable dye containing a triphenylmethane moiety and an eradicable dye containing a methine moiety.

15. The irreversible color-changing ink according to claim 14, wherein the eradicator comprises an eradicator selected from the group consisting of a basic nucleophilic anion and an acid oxidizing agent.

16. The irreversible color-changing ink according claim 1, wherein the components of the core are liquid.

17. The irreversible color-changing ink according claim 16, wherein the carrier is liquid.

18. A writing instrument comprising:
a writing point in fluid communication with an ink reservoir, wherein the ink reservoir contains an irreversible color-changing ink composition comprising a carrier and color-changing capsules dispersed in the carrier, the color-changing capsules comprising a shell and a core, the core comprising an eradicable dye capable of becoming substantially colorless and/or of changing color from a first colored state to a second colored state.

19. The writing instrument according to claim 18, wherein the carrier further comprises an eradicator.

20. The writing instrument according to claim 18, wherein the writing instrument is a marker or a ball pen selected from the group consisting of roller ball pens, gel pens, and ball point pens.

21. A method of irreversibly eradicating a written mark, comprising:
forming an eradicable written mark by applying an irreversible color-changing ink to a substrate, wherein the irreversible color-changing ink comprises a carrier and color-changing capsules dispersed in the carrier, the color-changing capsules comprising a shell and a core, the core comprising an eradicable dye capable of becoming substantially colorless and/or of changing color from a first colored state to a second colored state, and the carrier comprising an eradicator; and
applying a force directing component to the written mark thereby rupturing a portion of the color-changing capsules causing the eradicable dye to react with the eradicator thereby eradicating the written mark.

22. The method of claim 21, wherein the force directing component comprises an eraser selected from the group consisting of thermoplastic materials, thermoplastic elastomers, metals, and wood.

* * * * *